United States Patent [19]

Magara et al.

[11] Patent Number: 4,837,415
[45] Date of Patent: Jun. 6, 1989

[54] WIRE ELECTRODE TYPE ELECTRIC DISCHARGE MACHINING APPARATUS

[75] Inventors: Takuji Magara; Toshio Suzuki, both of Aichi, Japan

[73] Assignee: Mitsubishi Denki Kabushiki Kaisha, Tokyo, Japan

[21] Appl. No.: 112,170

[22] Filed: Oct. 26, 1987

[30] Foreign Application Priority Data

| Oct. 24, 1986 | [JP] | Japan | 61-252901 |
| Oct. 24, 1986 | [JP] | Japan | 61-252902 |
| Oct. 24, 1986 | [JP] | Japan | 61-252903 |
| Oct. 24, 1986 | [JP] | Japan | 61-252904 |
| Oct. 24, 1986 | [JP] | Japan | 61-252905 |
| Oct. 24, 1986 | [JP] | Japan | 61-252906 |
| Oct. 24, 1986 | [JP] | Japan | 61-252907 |
| Oct. 24, 1986 | [JP] | Japan | 61-252908 |
| Oct. 24, 1986 | [JP] | Japan | 61-252909 |
| Oct. 24, 1986 | [JP] | Japan | 61-252910 |
| Oct. 24, 1986 | [JP] | Japan | 61-252911 |
| Oct. 24, 1986 | [JP] | Japan | 61-252912 |
| Oct. 24, 1986 | [JP] | Japan | 61-252913 |
| Oct. 24, 1986 | [JP] | Japan | 61-252914 |
| Oct. 24, 1986 | [JP] | Japan | 61-252946 |

[51] Int. Cl.⁴ .................................................. B23H 7/06
[52] U.S. Cl. .................................. 219/69 W; 219/69.16
[58] Field of Search ............... 219/69 W, 69 C, 69 G; 204/206

[56] References Cited

U.S. PATENT DOCUMENTS

| 4,081,652 | 3/1978 | Janicke et al. | 219/69 W |
| 4,363,948 | 12/1982 | Itoh | 219/69 W |
| 4,465,914 | 8/1984 | Obara | 219/69 W |
| 4,467,166 | 8/1984 | Gamo et al. | 219/69 W |
| 4,523,073 | 6/1985 | Gamo et al. | 219/69 W |
| 4,649,252 | 3/1987 | Obara | 219/69 M |
| 4,703,143 | 10/1987 | Okubo et al. | 219/69 W |

FOREIGN PATENT DOCUMENTS

| 2748454 | 5/1978 | Fed. Rep. of Germany ... 219/69 W |
| 2826489 | 3/1979 | Fed. Rep. of Germany ... 219/69 W |

*Primary Examiner*—A. D. Pellinen
*Assistant Examiner*—Geoffrey S. Evans
*Attorney, Agent, or Firm*—Sughrue, Mion, Zinn, Macpeak, and Seas

[57] ABSTRACT

A wire electrode type electric discharge machining apparatus comprising a control means for controlling an interelectrode gap between a wire electrode and a workpiece to be machined to correct for a change which is caused by a change in the amount of machining removal at a corner. The machining accuracy of the wire electrode type electric discharge machining apparatus is remarkably improved.

31 Claims, 14 Drawing Sheets

WIRE ELECTRODE TYPE ELECTRIC DISCHARGE MACHINING APPARATUS

BACKGROUND OF THE INVENTION

1. Field of the Invention

This invention relates to wire electrode type electric discharge machining apparatus, and more particularly to an improvement of the machining accuracy thereof.

2. Description of the Prior Art

FIG. 1 is a schematic diagram outlining the arrangement of a conventional wire electrode type electric discharge machining apparatus. Such an apparatus is described in Published Unexamined Japanese patent Application No. 52129/1981.

In FIG. 1, reference numeral 1 designates a wire electrode; 2, a workpiece to be machined; 3, an X-slider for moving the workpiece 2 right and left in FIG. 2; 4, a Y-slider for moving the workpiece in parallel with the surface of the drawing; 5, a servo motor for driving the X-slider 3; 6, a servo motor for driving the Y-slider 4; 7, a servo amplifier for supplying current to the servo motor 5; 8, a servo amplifier for supplying current to the servo motor 6; 9, a machining power source for applying a pulse voltage between the wire electrode 1 and the workpiece 2; 10, a detector for detecting an average machining voltage between the wire electrode 1 and the workpiece; and 11, a control unit for controlling the servo amplifiers 7 and 8 according to the output signal of the detector 10 and a predetermined machining program.

The operation of the electric discharge machine thus organized will be described.

The wire electrode 1 is fed at a predetermined speed, while the machining power source 9 applies the pulse voltage between the wire electrode 1 and the workpiece 2 to cause electric discharge therebetween to machine the workpiece 2. In this operation, the control unit 11 applies movement instruction signals to the servo amplifiers 7 and 8, respectively, according to the machining program, and in response to these signals, the servo motors 5 and 6 drive the X-slider 3 and the Y-slider 4, respectively, so that the workpiece is machined as required.

In general, machining conditions change frequently. Therefore, in response to the average voltage between the electrode detected by the detector 10, the control unit, drives the X-slider 3 and the Y-slider 4 at suitable feed speeds so that the machining gap between the wire electrode 1 and the workpiece 2 is maintained constant.

In a machining operation, generally after a coarse machining operation, an end-face finish-machining operation is carried out several times so that the resultant configuration and surface roughness are satisfactory in accuracy. The configuration accuracy of a finish-machined workpiece depends on the interelectrode gap, and therefore, in the case where it is required to machine a workpiece with high accuracy, it is essential to maintain the interelectrode gap at a constant. FIG. 2 is an enlarged diagram showing the wire electrode 1 and the workpiece 2 in the electric discharge machining operation. In a conventional ordinary system in which the average voltage is controlled so as to be constant, as the amount of removal L increases as the machining speed U is decreased, as a result of which in the interelectrode area (D in the figure) the machining integration effect is increased, and the interelectrode gap Gs is thus greater than 60. That is, if the amount of removal L changes while the machining electrical conditions and the average servo voltage are maintained unchanged, then the interelectrode gap becomes nonuniform, and therefore the workpiece machined workpiece is low in configuration accuracy. FIG. 3 is a graphical representation indicating amounts of removal L with interelectrode gap Gs with the machining electrical conditions and the average servo voltage maintained unchanged. As is apparent from FIG. 3, the interelectrode gap Gs changes greatly with variation in the amount of removal L.

In an actual workpiece machining operation, the amount of removal L is maximum at a corner. FIGS. 4(a)n and 4(b) are enlarged views showing the wire electrode 1 and the workpiece 2 in an inside-corner finish-machining operation. As is apparent from FIGS. 4(a) and 4(b), the amounts of removal L ($L_2$ through $L_4$) at the corner are much larger than those ($L_0$ and $L_5$) in a straight machining operation. FIG. 5 shows the variation in the amount of removal L at an inside corner. As is clear from FIG. 5, the amount of removal L decreases starting at a position before the start point of the corner (cf. H1 in FIG. 5) until it reaches a certain value, the amount of removal thus increased is maintained at the certain value for a while, and then the amount of removal decreases starting at a position before the end point of the corner (cf. H3 in FIG. 5) until it reaches the value in the straight machining operation again.

Thus, especially at the inside corner, the amount of removal L increases and the interelectrode gap Gs also increases, with the result that the machined workpiece is considerably low in configuration accuracy due to the amount of excessive cut d as shown in FIG. 6. On the other hand, at the outside corner, the amount of removal L decreases and the interelectrode gap Gs also decreases, as a result of which the machined workpiece is also considerably low in configuration accuracy.

The conventional wire electrode type electric discharge machining apparatus thus constructed suffers from a difficulty in that especially at a corner the interelectrode gap changes with the amount of removal, as a result of which the machined workpiece is considerably low in configuration accuracy.

SUMMARY OF THE INVENTION

In view of the foregoing, an object of the present invention is to provide a wire electrode type electric discharge machining apparatus in which the corner machining accuracy is greatly improved.

The above and other objects of the present invention are met by the provision of a wire electrode type electric discharge machining apparatus according to the invention, which comprises control means for predicting a change in the amount of removal at a corner to thereby correct the change of the interelectrode gap which attributes to the change in the amount of removal.

DETAILED DESCRIPTION OF THE INVENTION

One preferred embodiment of this invention will be described with reference to FIG. 7.

Figure 1:
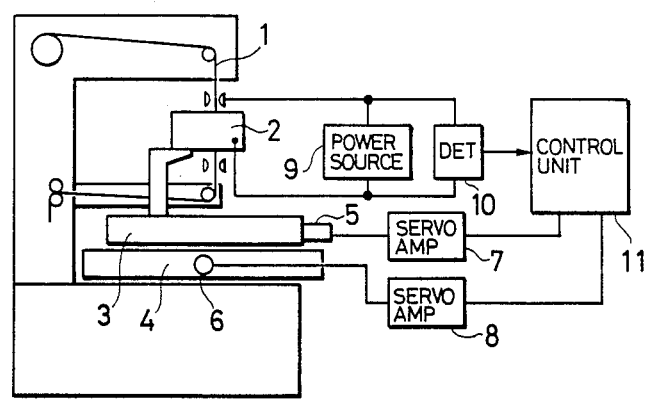
FIG. 1 is a diagram showing the arrangement of a conventional wire electrode type electric discharge machining apparatus.
Figure 2:
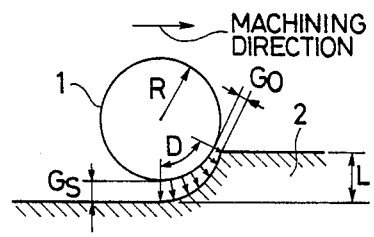
FIG. 2 is an enlarged view showing a wire electrode and a workpiece in a finish-machining operation.
Figure 3:
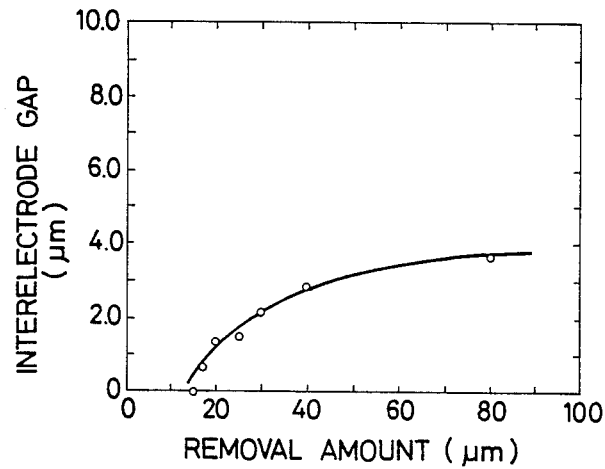
FIG. 3 is a graphical representation indicating amounts of removal with interelectrode gap.
Figure 7:
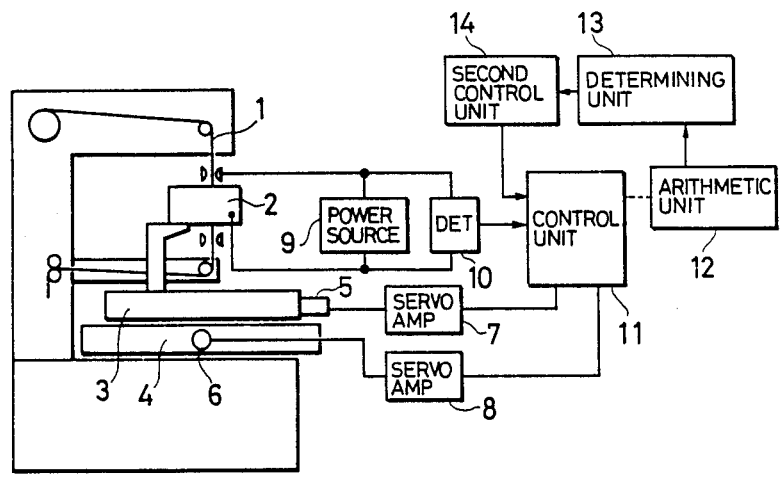
FIG. 7 is a diagram showing the arrangement of the first embodiment of a wire electrode type electric discharge machining apparatus according to the present invention.

In FIG. 7, reference numeral 1 designates a wire electrode; 2, a workpiece to be machined; 3, an X-slider for moving the workpiece 2 right and left in FIG. 1; 4, a Y-slider for moving the workpiece 2 in parallel with the surface of the drawing; 5, a servo motor for driving the X-slider 3; 6, a servo motor for driving the Y-slider 4; 7, a servo amplifier for supplying current to the servo motor 5; 8, a servo amplifier for supplying current to the servo motor 6; 9, a machining power source for applying a pulse voltage between the wire electrode 1 and the workpiece 2; 10, a detector for detecting an average machining voltage between the wire electrode 1 and the workpiece 2; and 11, a central processing unit for controlling the servo amplifiers 7 and 8 according to the output signal of the detector 10 and a predetermined machining program.

Further in FIG. 1, reference numeral 12 designates an arithmetic unit for calculating the position before the start point of a corner where the amount of removal starts to change (the distance between the position and the start point of the corner being referred to as "the removal change start distance", when applicable); 13, a determining unit for determining whether or not the distance between the present machining position and the corner's start point coincides with the result of calculation by the arithmetic unit 12; and 14, a second control unit for changing the machining electrical conditions according to the output signal of the determining unit 13.

The operation of the electric discharge machine thus organized will be described.

Similarly as in the above-described conventional machine, the wire electrode 1 is run at a predetermined speed, while the machining power source 9 applies the pulse voltage between the wire electrode 1 and the workpiece 2 to cause electric discharge therebetween to machine the workpiece. According to programmed loci given to the central processing unit 11, movement instruction signals are applied to the servo amplifiers 7 and 8, and in response to these signals the servo motors 5 and 6 drive the X-slider 3 and the Y-slider 4 so that the workpiece is machined as required. In response to the average interelectrode voltage detected by the detector 10, the control unit 11 operates to drive the X-slider 3 and the Y-slider 4 at most suitable speeds so that the machining gap between the wire electrode 1 and the workpiece 2 is maintained. After a coarse machining operation, an end-face finish-machining operation is carried out several times in this manner so that the as workpiece machined is satisfactory in configuration accuracy and in surface roughness. As was described above, the configuration accuracy of a machined workpiece depends on the interelectrode gap, and when it is required to machine a workpiece with high configuration accuracy, it is essential to maintain the interelectrode gap constant.

In a finish-machining operation, the arithmetic unit 12 calculates the above-described removal change start distance ($H_1$ in FIG. 5) before a corner machining operation according to a corner radius, an amount of offset and a wire electrode diameter which have been given to the central processing control unit 11 in advance. The determining unit 13 receives the removal change start distance $H_1$ calculated by the arithmetic unit 13 and the distance between the present machining position and the corner's start point, to determine whether or not the two distances coincide with each other. When the two distances coincide with each other, the determining unit 13 outputs a signal to activate the second control unit 14. In response to the signal from the determining unit 13, the second control unit 14 selects a new reference voltage for the interelectrode servo and switches it to the new one, and, after the corner machining operation, changes the new reference voltage back to the old (previous) reference voltage. For instance in an inside corner machining operation, as was described before the interelectrode gap increases with the amount of removal L; that is, the workpiece is excessively cut (over-cutting), and therefore the control unit 14 switches the reference voltage to reduce the interelectrode gap so that the over-cutting due to the machining integration effect is corrected.

The above-described series of operations are automatically carried out for each of the corners. That is, it is unnecessary for the operator to switch the reference voltage in the machining operation.

In the above-described first embodiment, the central processing unit 11, the arithmetic unit 12, the determining unit 13 and the second control unit 14 are provided separately; however, they may be combined into one control unit which performs the functions of these four units. Furthermore, in the above-described embodiment, the correction is carried out only for an inside corner; however, if a second determining unit is provided to determine whether a corner to be machined is an inside corner or an outside corner, then the correction can be given to both of the inside and outside corners.

A second embodiment of the invention, which is more intricate than the first embodiment, will be described. In the second embodiment, the central control unit 11, the arithmetic unit 12, the determining unit 13 and the control unit 14 of the first embodiment are combined into one unit. The second embodiment further comprises a computerized numerical control device (CNC).

A machining program including a plurality of blocks has been stored in an NC program memory in the main memory of the CNC. The machining program defines a final configuration which is obtained by machining as shown in FIG. 8 for instance.

In a wire electrode type electric discharge machining method, the final configuration is not given to the workpiece by only one machining operation; that is, the machining operation is repeatedly carried out along the locus MP defined by the machining program, and finally a surface is formed with high accuracy. Let us consider the case where a workpiece is shaped by machining it three times. In this case, first the workpiece is machined in such a manner that the central axis of the wire electrode 1 is moved along a line which is spaced by a predetermined offset value $h_1$ from the locus MP of the machining program (this machining operation being called "a first cutting operation". Next, the workpiece is machined in such a manner that the central axis of the wire electrode is moved along a line which is spaced by an offset value $h_2$, smaller than the offset value $h_1$, from the locus MP. Finally, the workpiece is finish-machined in such a manner that the central axis of the wire electrode 1 is moved along a line which is spaced apart by an offset value $h_3$, smaller than the offset value $h_2$, from the locus MP, so that a surface 20 which substantially coincides with the machining program locus MP is formed.

Figure 8:
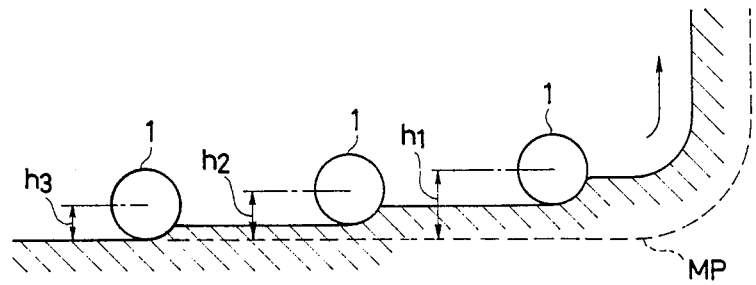
FIG. 8 is a schematic diagram illustrating a machining process according to the present invention.

FIG. 8 shows one example of an inside corner machined with the electric discharge machine of the invention. However, the preceding description is equally applied to the case of an outside corner.

Figure 9:
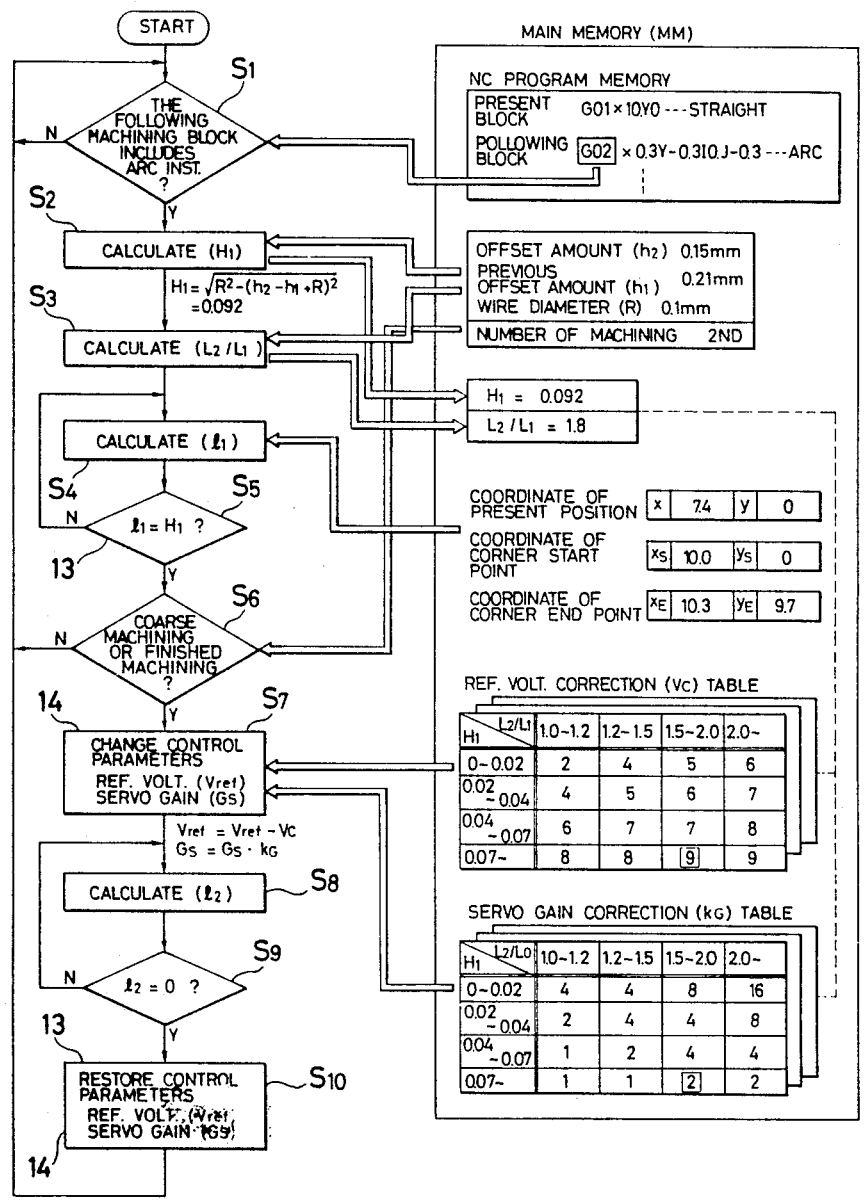
FIG. 9 is a flow chart showing an operation of a computerized numerical control device (CNC)

FIG. 9 is a diagram showing the operation of the CNC and data stored in the main memory MM. The operation of the CNC will be described.

When an electric discharge machining operation is started, in step $S_1$ it is determined whether or not the following machining block of the machining program includes an arc instruction; that is, it is determined whether or not a corner is involved. For instance when the program includes G02, then it is determined that the block includes an arc instruction.

Figure 4A:
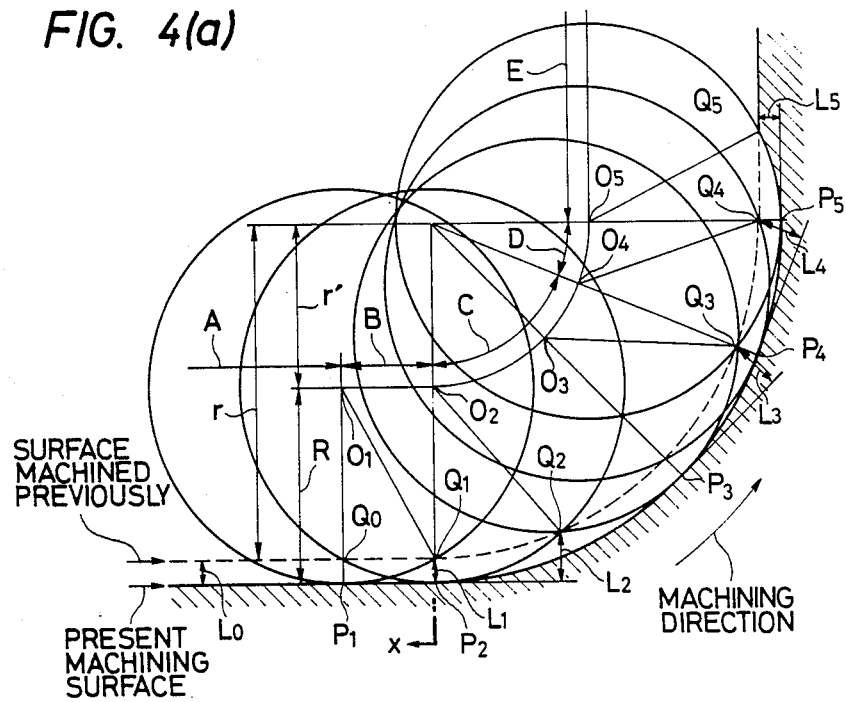
FIGS. 4(a) and 4(b) are enlarged views showing a wire electrode and a workpiece in an inside corner finish-machining operation.
Figure 4B:
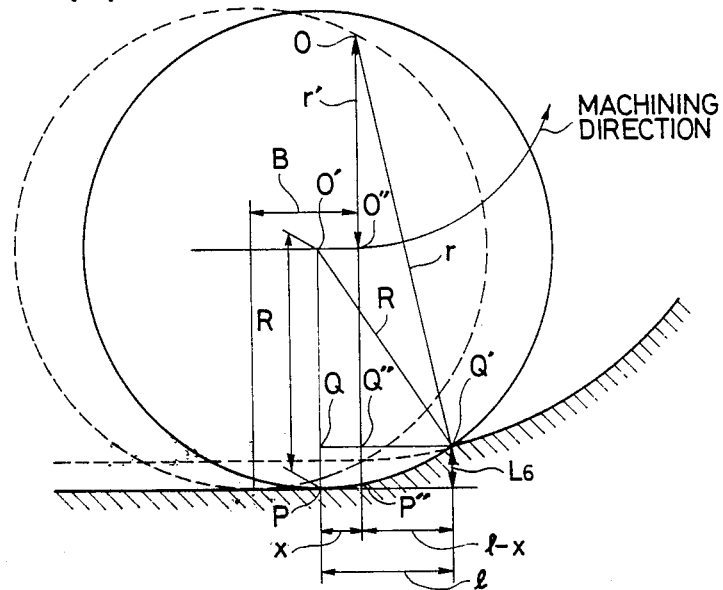

In step $S_2$, with respect to the amount of removal L in machining, a change start distance $H_1$ is calculated. The distance $H_1$ is the length of the region B in part (A) of FIG. 4; that is, it is equal to segment $O_1O_2$. The distance $H_1$ can be obtained from the following equation:

$$\overline{O_1O_2} = \sqrt{R^2 - (r - r')^2}, \text{ or}$$

$$H_1 = \sqrt{R^2 - (h_2 - h_1 + R)^2} \text{ as shown in FIG. 9.}$$

where, as is apparent from FIGS. 4 and 9, R is the radius of the wire electrode, r is the radius of the corner of the preceding machined surface, $h_1$ is the offset value of the preceding machining operation, $h_2$ is the offset value of the present machining operation, and r' is the radius of the locus of the wire electrode.

In the following step $S_3$, the ratio of the amounts of removal ($L_2/L_1$) is calculated. In the expression $L_2/L_1$, $L_1$ and $L_2$ are the amounts of removal provided when the central axis of the wire electrode 1 comes to $O_1$ and $O_2$, respectively, as is clear from part (a) of FIG. 4.

In step $S_4$, the distance $l_1$ between the present machining position and a corner start point is calculated. The distance can be readily obtained by comparison of the coordinates of the present machining position with those of the corner start point.

In step $S_5$, it is determined whether or not the distance $l_1$ is equal to the above-described change start distance $H_1$. When it is determined that the former $l_1$ is equal to the latter $H_1$, Step $S_6$ is effected. In step $S_6$, it is determined whether the machining operation is a rough-machining operation or a finish-machining operation. In the case of FIG. 8 described above, the first machining operation is a rough-machining operation, and the last machining operation is a finish-machining operation. It is determined from the number of times of machining stored in the main memory whether the machining operation is a rough-machining operation or a finish-machining operation.

When it is determined that the machining operation is a finish-machining operation, step $S_7$ is effected in which machining condition control parameters are changed.

In the case of FIG. 9, data tables of the reference voltage and servo gain, control parameters to be corrected, is stored, and a correcting value $V_C$ or correcting coefficient $K_G$ is obtained from a matrix of the change start distance ($H_1$) and the amount of removal change ratio ($L_2/L_1$).

As is well known in the art, in the servo mechanism of the electric discharge machine, the gap between the wire electrode and the workpiece is controlled according to the difference between an average machining voltage $V_g$ actually applied between the electrodes and a reference average voltage $V_{ref}$ predetermined so that the two voltages become equal to each other. Therefore, the interelectrode gap can be changed by controlling the servo reference voltage or gain as described above.

In step $S_7$, the reference average voltage $V_{ref}$ is adjusted (increased or decreased), and the servo gain Gs is corrected using the correcting coefficient.

In step $S_8$, the distance $l_2$ between the present machining position and a corner end point is calculated. In other words, the distance $l_2$ between the present machining position and the point $O_5$ in FIG. 4 is calculated.

In the next step $S_9$, it is determined whether or not the distance $l_2$ is zero (0). When it is determined that the distance $l_2$ is zero, machining the corner has been accomplished. Therefore, in step $S_{10}$ the control parameters are restored, and step $S_1$ is effected again.

Figure 5:
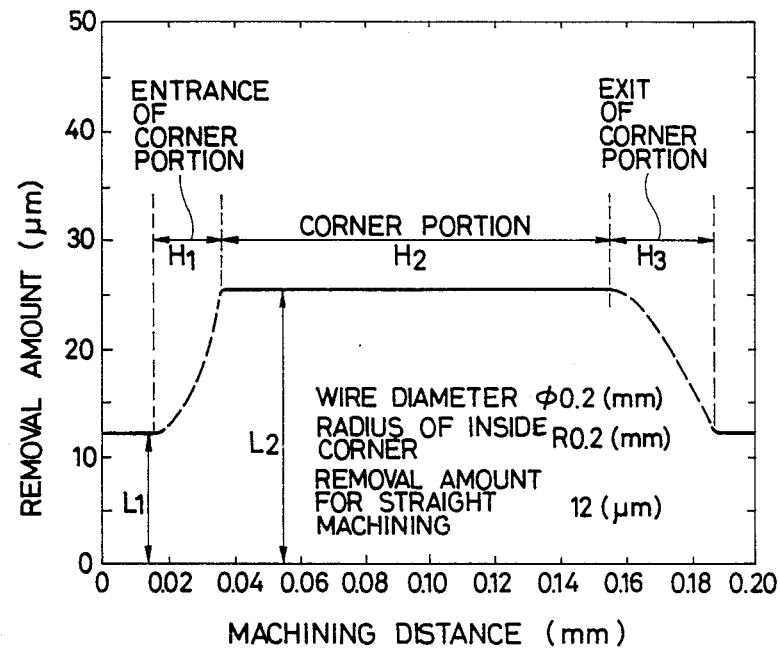
FIG. 5 is a graphical representation indicating variations in the amount of removal at an inside corner.
Figure 6:
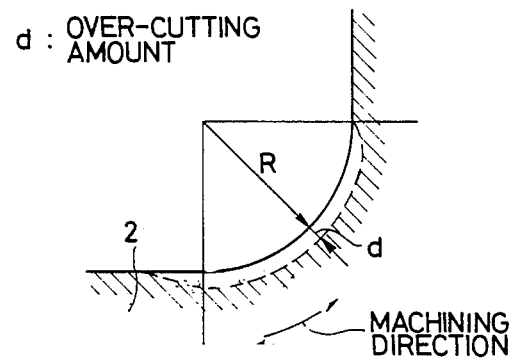
FIG. 6 is a diagram showing an excessive cut at an inside corner.

Let us consider amounts of removal (L) in machining an inside corner as shown in part (a) of FIG. 4 and FIG. 5. The amount of removal at the inside corner changes abruptly in the interval B (between $O_1$ and $O_2$) located before an arcuate locus to be followed by the wire electrode ($L_1 \rightarrow L_2$) and it is maintained constant in the arcuate movement interval C (between $O_2$ and $O_4$) ($L_2 = L_3 = L_4$). The machining operation is further continued and the amount of removal is decreased in the interval D (between $O_4$ and $O_5$) located immediately before the end of the arc ($L_4 \rightarrow L_5$), and it is constant in the interval E which is a straight machining interval, being equal to the original amount of removal ($L_5 = L_0$).

In this embodiment, in correspondence to the variation in the amount of removal ($L_1$ to $L_2$), the amount-of-removal start distance ($H_1$) and the amount-of-removal charge ratio ($L_2/L_1$) are calculated according to the data stored in the main memory MM before the wire electrode reaches the point $O_2$, in advance.

In part (b) of FIG. 4, the amount of removal $L_b$ in the interval B (equal to $L_2$ in part (a) of FIG. 4) can be calculated according to the following equation:

$$L_b = R - \sqrt{R^2 - l^2}$$

On the other hand, $$r' + R = L_b(x) + \sqrt{r^2 - (l-x)^2}$$

Therefore, when l is eliminated from these two equations, then the following equation can be obtained. And Lb can be obtained by solving the equation.

$$L_b(x) + \sqrt{r^2 - (2R\,L_b(x) - L_b^2(x) - x)^2} - R - r' = 0$$

The distance of the interval B can be obtained from the following expression as was described before;

$$\sqrt{R^2 - (r - r')^2}$$

Figure 10:
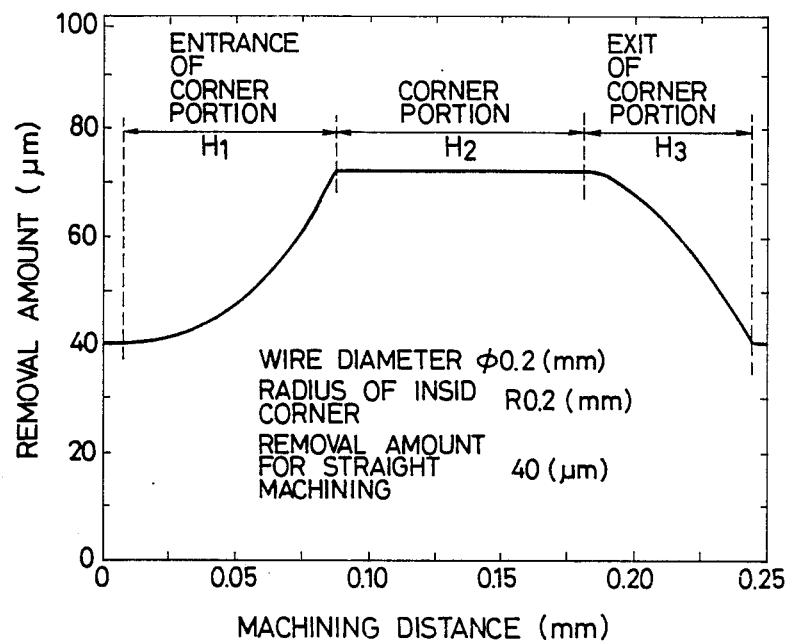
FIG. 10 is a diagram showing variations in the amount of removal of an inside corner.

FIG. 10 shows variations in the amount of removal of an inside corner which is machined with removal of 40 μm for straight machining with the second cutting operation taken into account (wire electrode 0.2 mm in diameter, and the inside corner 0.2 mm in radius). In this machining operation, the amount of removal starts to increase at a point about 80 μm before the start point of the corner, and it is constant, about 72 μm, while the corner is being machined. The amount of removal starts to decrease at a point about 65 μm before the end point of the corner, and finally it is returned to 40 μm the straight machining operation is carried out again.

Figure 11:
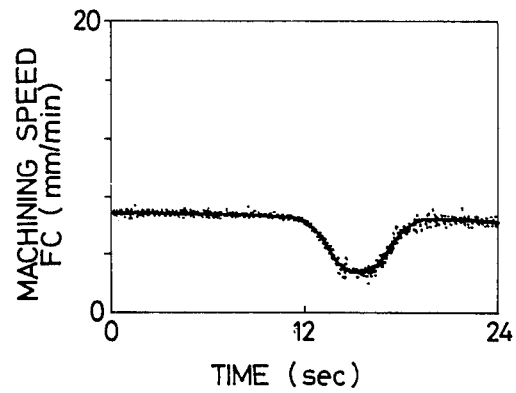
FIG. 11 is a diagram showing machining speeds (FC value) in the second cutting operation of an inside corner.

FIG. 11 shows machining speeds (FC values) in the second cutting operation of an inside corner. With electrical conditions maintained unchanged, the machining speed is substantially inversely proportional to the amount of removal. Therefore, FIG. 11 demonstrates that the amount of removal changes at the corner.

Figure 12:
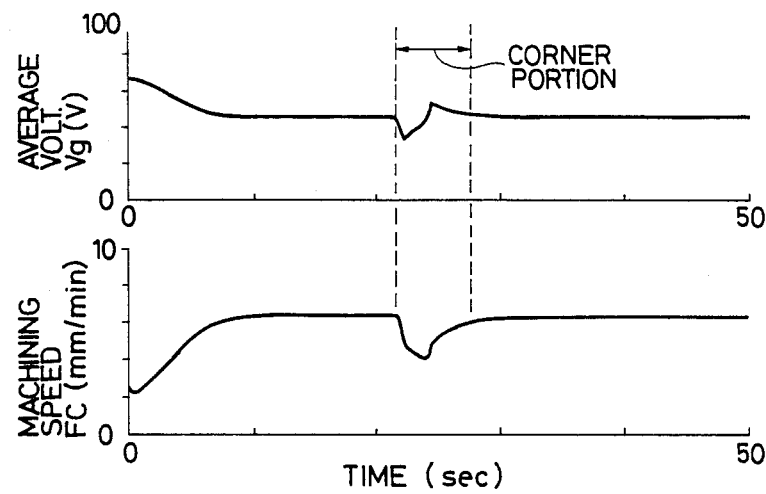
FIGS. 12 to 17 are graphical representations for a description of the effects of the present invention.
Figure 13:
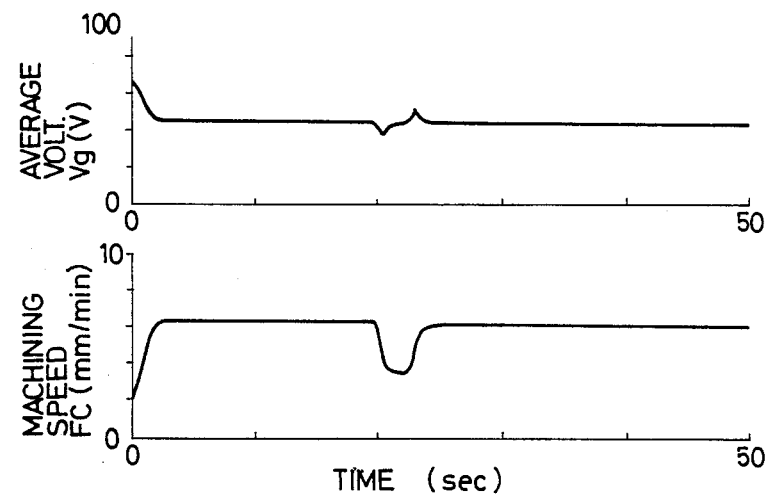

FIGS. 12 through 19 are graphical representations for a description of the effects of the invention. More specifically, FIG. 12 shows the conventional method in which at a corner part the servo gain is not corrected, and FIG. 13 shows the method of the invention in which the servo gain is corrected ($K_B=4$). In both of FIGS. 12 and 13, the wire electrode is 0.2 mm in diameter, the corner radius is 0.2 mm, and the amount at removal $L_1$ of the straight part is 40 μm. As is apparent from FIGS. 12 and 13, when the servo gain is corrected at the corner part, the time constant at the rise or fall of the corner part machining speed is decreased; that is, the response characteristic of the machine to a corner part is improved. This tendency is significant especially near the machining end point of a corner.

Figure 14:
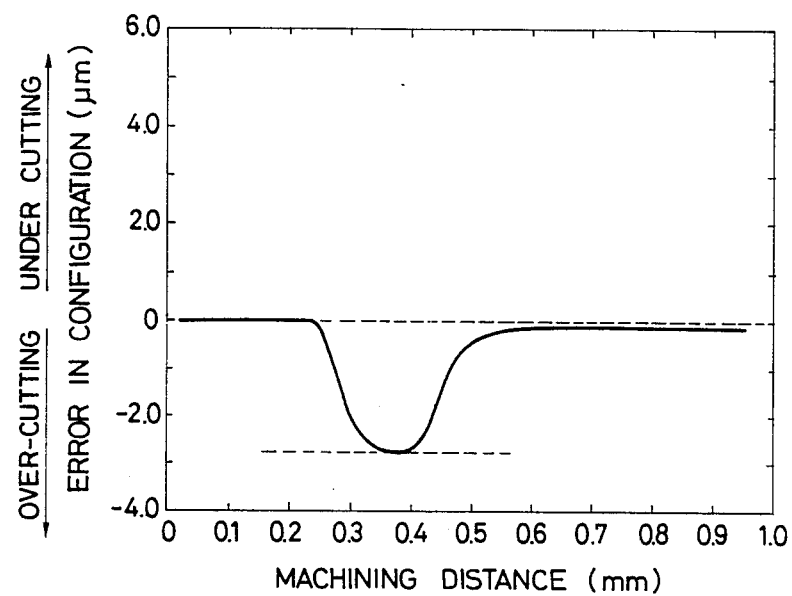
Figure 15:
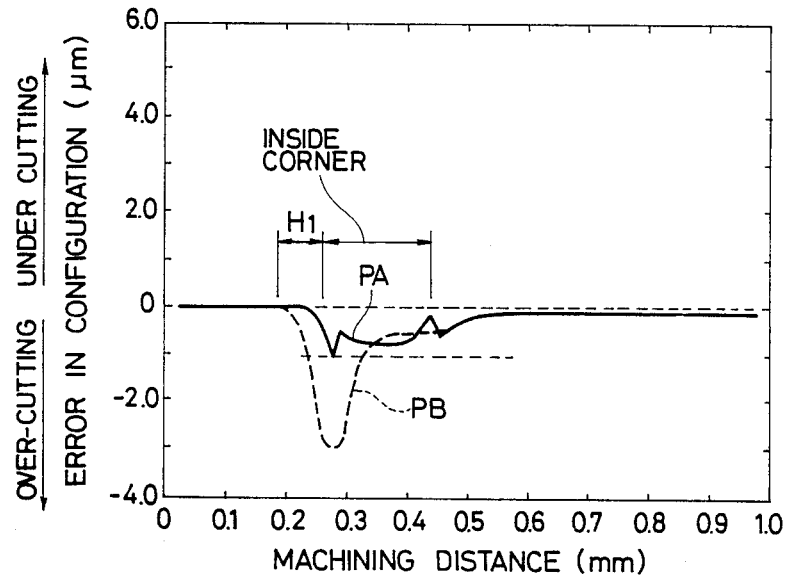
Figure 16:
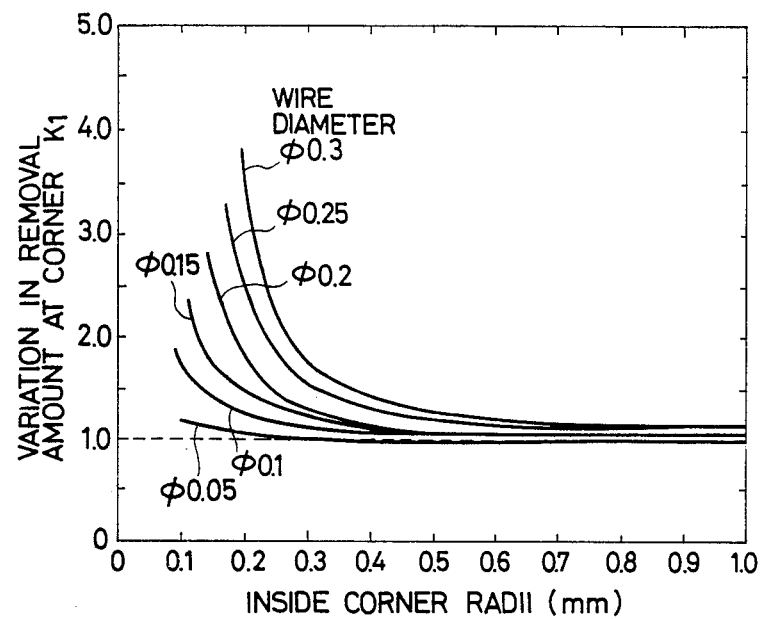

FIGS. 14 and 15 illustrate effects provided when the servo reference voltage is corrected for an inside corner. In other words, FIG. 14 shows the conventional method in which the reference voltage is not corrected, and FIG. 15 shows the method of the invention. In both of FIGS. 14 and 15, the wire electrode is 0.2 mm in diameter, the corner radius is 0.2 mm, and the amount of removal L1 of the straight part is 40 μm. In FIG 15., the reference voltage correcting value $V_c=9(V)$. As is apparent from FIGS. 14 and 15, correction of the reference voltage greatly contributes to reduction of the amount of overcut. Starting the reference voltage correction at the amount-of-removal change start point (as indicated by the curve PA in FIG. 15) can reduce the configuration error more than starting it at the inside corner start point (or the arcuate movement start point)(as indicated by the curve PS in FIG. 15).

Figure 17:
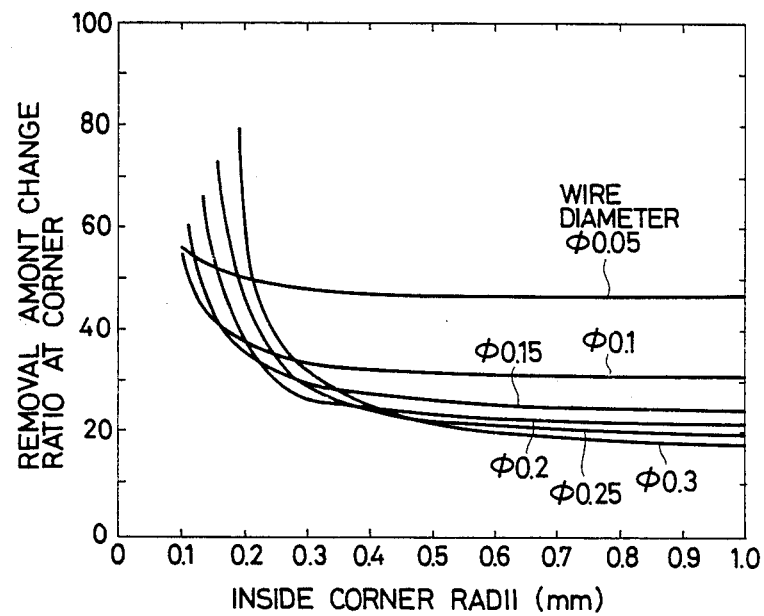

FIG. 17 is a graphical representation indicating inside corner radii (R) with corner amount-of-removal change ratios ($L_2/L_1$) provided in the case where wire electrodes 0.05, 0.1, 0.15, 0.2, 0.25 and 0.3 mm in diameter are used, and the amount of removal for the straight part is set constant (12 μm). With any one of the wire electrodes, the corner part amount-of-removal change ratio ($L_2/L_1$) is inversely proportional to the inside corner radius (R). The tendency is increased with the diameter of the wire electrode. The amount-of-removal change affects the gap enlargement due to the integration effect, i.e., the configuration error.

Figure 18:
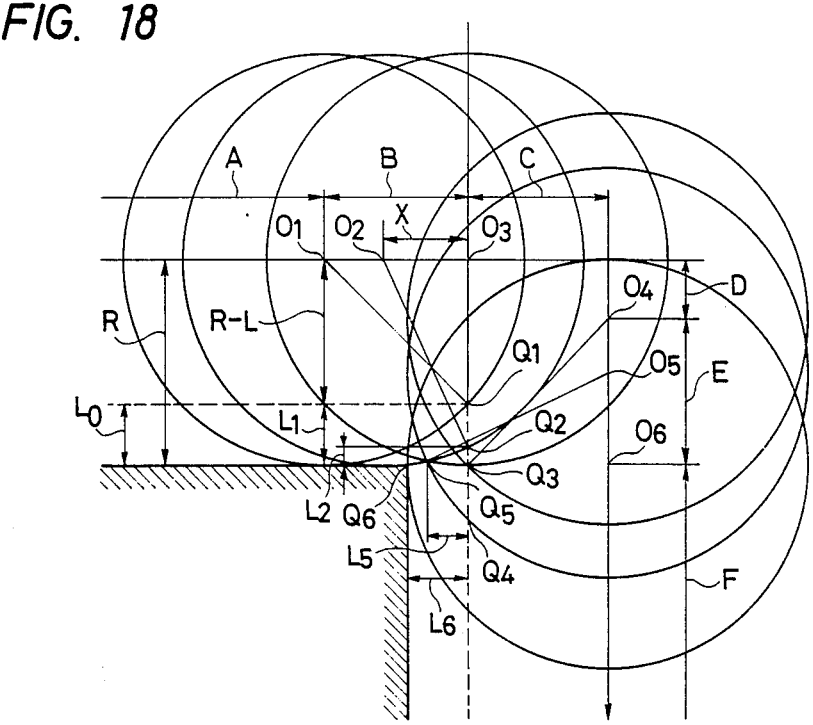
FIG. 18 is a diagram for a description of variations in the amount of removal at an outside corner.

FIG. 18 is a graphical representation indicating corner radii (R) with amount-of-removal change gradients $((L_2-L_1)/H_1)$ provided when wire electrodes 0.05, 0.1, 0.15, 0.2, 0.25 an 0.3 mm in diameter are used, and the amount of removal $L_1$ for the straight part is set to a constant (12 μm). The method of the invention is more effective when the gradient is high. When, in the conventional control method, the gradient is 40 or higher, then it becomes impossible to continue the machining operation or the machining accuracy will greatly lowered.

FIG. 18 is a diagram for a description of the variation in the amount of removal at an outside corner.

At a sharp edge part, the amount of removal is constant when the central axis of the wire electrode is located in the interval A, and it is abruptly decreased when in the interval B ($O_1$–$O_3$), and it is zero when at the position $O_3$. Furthermore, the amount of removal is maintained unchanged, zero, when the central axis of the wire electrode is located in the intervals C and D ($O_3$–$O_4$), and it is abruptly increased when in the interval E($O_4$–$O_6$) and it is restored to the straight part amount-of-removal $L_0$ when at the position $O_6$.

A method of calculating an the amount-of-removal change start distance (H1) for an outside corner is different from that which has been described for an inside corner.

$$H_1 = \overline{Q_1 Q'_1}$$

This is the length of the interval B. Therefore, $H_1$ can be obtained according to the following equation:

$$H_1 = \sqrt{(2R\,L_0 - L_0^2}$$

The amount of removal $L_s$ for the interval B can be obtained by calculating the following expression:

$$L_B = R - \sqrt{R^2 - x^2}$$

The distance $\overline{O_4 O_6}$ of the interval E can be obtained by calculating the following expression:

$$\overline{O_4 O_6} = \sqrt{R^2 - (R - L_0)^2}$$

The amount of removal $L_E$ of the interval E can be obtained from the following expression:

$$L_E = \sqrt{R^2 - (R - y)^2} - (R - L_0)$$

Figure 19:
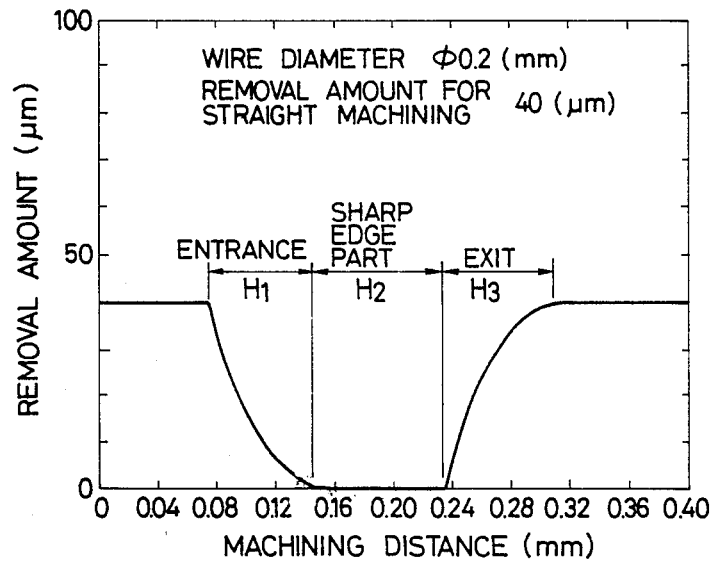
FIG. 19 is a diagram showing variations in the amount of removal at a sharp edge part.

FIG. 19 shows variations in the amount of removal at a sharp edge part which is machined with an amount of removal of 40 μm for the straight machining part with the second cutting operation taken into account (the wire electrode is 0.2 mm in diameter). In this machining operation, the amount of removal starts decreasing at a point a point about 70 μm before the end point of the sharp edge part, and becomes zero at the end point of the sharp edge part. Then, the direction of movement of the wire electrode is changed. Thereafter, the amount of removal is decreased for the period of time for which be wire electrode is moved about 70 μm after reaching the end point of the sharp edge part, and it is restored to the straight part amount-of-removal 40 μm.

In the flow chart of FIG. 9, step $S_6$ may be positioned before step $S_1$. In the control of the outside corner machining operation, step $S_6$ is positioned after step $S_1$, and the calculation routines of steps $S_2$ and $S_3$ are changed over to those for an outside corner machining operation. That is, in the case of an outside corner machining operation, the arithmetic expressions of steps $S_3$ and $S_4$ are different from those in the case of an inside corner machining operation, and therefore the change should be done in step $S_1$.

Let us consider a reference voltage correcting value ($V_c$) table and a servo gain correcting coefficient ($K_G$) table. The data $H_1$ is decreased as $L_1$ decreases. The decrease of $H_1$ means the fact that, if $L_2/L_1$ is maintained unchanged, the amount of removal changes abruptly. Therefore, it is necessary to increase the servo gain correcting coefficient $K_G$ and to decrease the reference voltage correcting value $V_C$. In the case where $H_1$ is maintained unchanged, it is necessary to increase the reference voltage correcting value $V_C$ and the servo gain correcting coefficient $K_G$ with the ratio $L_2/L_1$.

In the invention, the control parameters to the corrected may include not only the servo reference voltage and the servo gain in the above-described embodiment, but also the machining speed and offset value as described above, and those well known as machining electrical conditions such as an interelectrode voltage under no load, the peak value of an interelectrode current, and a pause period between successive electric discharge machining operations. The correcting values or coefficients of these control parameters are stored in the main memory MM in correspondence to the amount-of-removal change ratios ($L_2/L_1$) and the amount-of-removal change start distances ($H_1$).

FIGS. 20 to 27 are schematic diagrams illustrating the other embodiments of a wire electrode type electric discharge machining apparatus according to the present invention.

Figure 20:
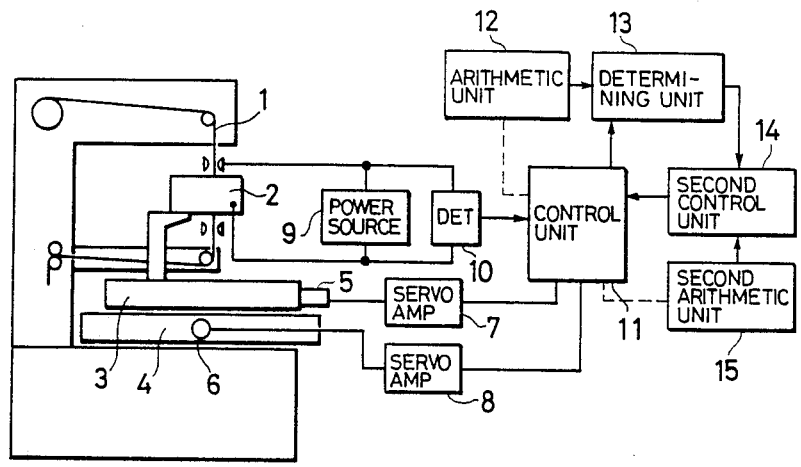
FIGS. 20 to 27 are schematic diagrams each showing other embodiments of the present invention.

In FIG. 20 which shows the third embodiment of the present invention, a second arithmetic unit 15 is provided to calculate a corrected machining speed taking variation in the amount of removal L at the corner into account. In response to the outputs from the determining unit 13 and the arithmetic unit 15, the control unit 14 controls the central control unit 11 so as to switch the actual machining speed. After the corner machining operation, the control unit 14 switches the new corrected machining speed over to the previous machining speed for the straight machining operation. For instance, in an inside corner machining operation, as was described before, the interelectrode gap increases with the increase of the amount of removal L. This results in an occurrence of over-cutting, and therefore the control unit 14 switches the machining speed to a higher machining speed so that the machining speed is prevented from decreasing excessively at the corner to thereby eliminate occurrence of the overcutting due to the machining integration effect.

Figure 21:
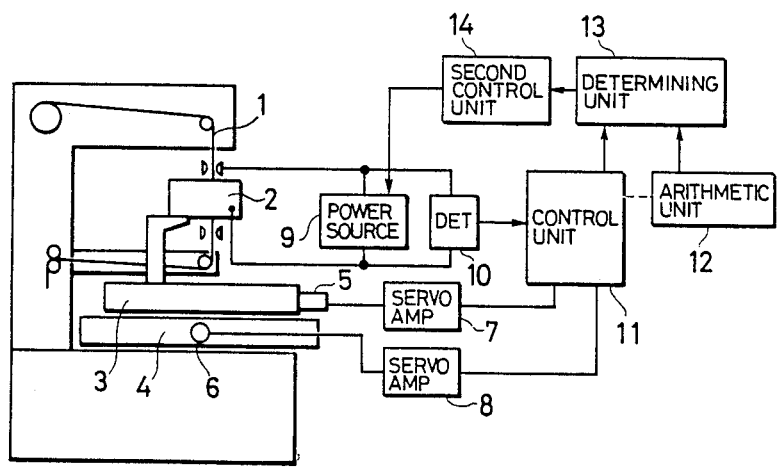

In FIG. 21 which shows the fourth embodiment of the present invention, the control unit 14 selects new machining electrical conditions for the corner in response to the output of the determining unit 13 and switches the output of the machining power source. After the corner machining operation, the control unit 14 switches the new machining electrical conditions over to the previous conditions. For instance, in an inside corner machining operation, as was described above, the interelectrode gap increases with the amount of removal L; that is, the workplace is excessively cut, and therefore the control unit 14 switches the machining electrical conditions over the those for reducing the interelectrode gap so that over-cutting due to the machining integration effect is eliminated.

Figure 22:
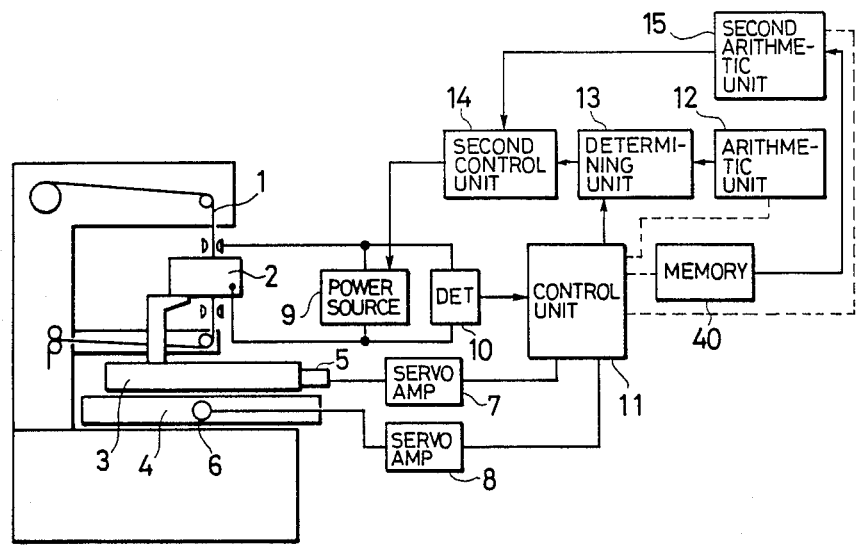

In FIG. 22 which shows the fifth embodiment of the present invention, a memory 40 is provided to store the values of a discharge gap in the straight machining operation under a variety of machining conditions and the amount of removal in the straight machining operation, the amount of removal being obtained based on the shift amount of the electrode, which represents the difference between the offset amount in the previous machining operation and that in the present machining operation. The arithmetic unit 15 calculates the amount of removal at the corner in accordance with the values stored in the memory 40, the corner radius, the diameter of the wire electrode and the like. The control unit 14 selects new machining electrical conditions for the corner in response to the output of the determining unit 13 and the result of the arithmetic operation in the arithmetic unit 15, and switches the output of the machining power source. After the machining operation for the corner, the new machining condition are restored to the previous machining electrical conditions. For instance, in an inside corner machining operation, the interelectrode gap increases with the increase of the amount of removal L. That is, the workpiece is excessively cut, and therefore the control unit 14 switches the machining electrical conditions over to those for reducing interelectrode gap so that the over-cutting due to the machining integration effect is eliminated.

Figure 23:
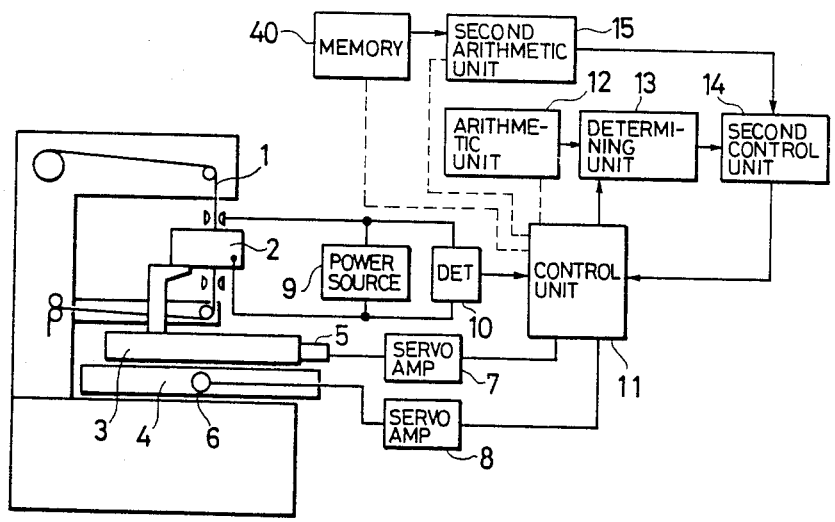

In FIG. 23 which shows the sixth embodiment of the present invention, a memory 40 as shown in FIG. 22 is also provided to store the same parameters. In response to the outputs of the determining unit 13 and the arithmetic unit 15, the control unit 14 selects a new gain for the interelectrode servo for the corner machining operation and switches the interelectrode servo gain. After the corner machining operation, the new gain is restored to the previous one. For instance, in an inside corner machining operation, the control unit 14 switches the interelectrode servo gain to a smaller one to eliminate the occurrence of the over-cutting.

Figure 24:
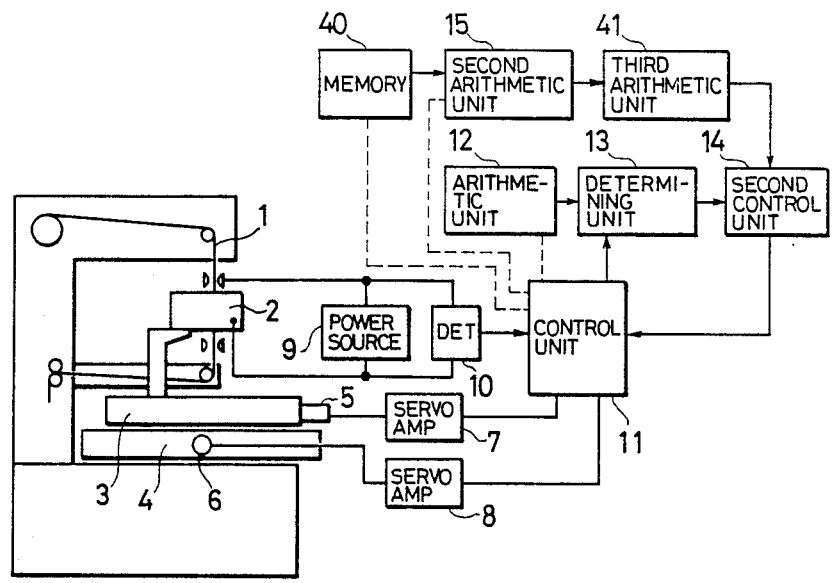

In FIG. 24 which shows the seventh embodiment of the present invention, a third arithmetic unit 41 is provided to calculate a correction amount for a program locus at a corner in response to the output of the second arithmetic unit 15 so that the machined workpiece always has the desired configuration regardless of variations in the amount of removal. The control unit 14 controls the central control unit 11 in response to the outputs of the determining unit 13 and the arithmetic unit 41 so that the actual machining locus coincides with the desired corrected locus. For instance, in the case of the inside corner machining operation the control unit 14 controls the center control unit 11 so that the wire electrode 1 moves along the corrected locus which is obtained by shifting the machining locus to the center of the corner by the correction amount.

Figure 25:
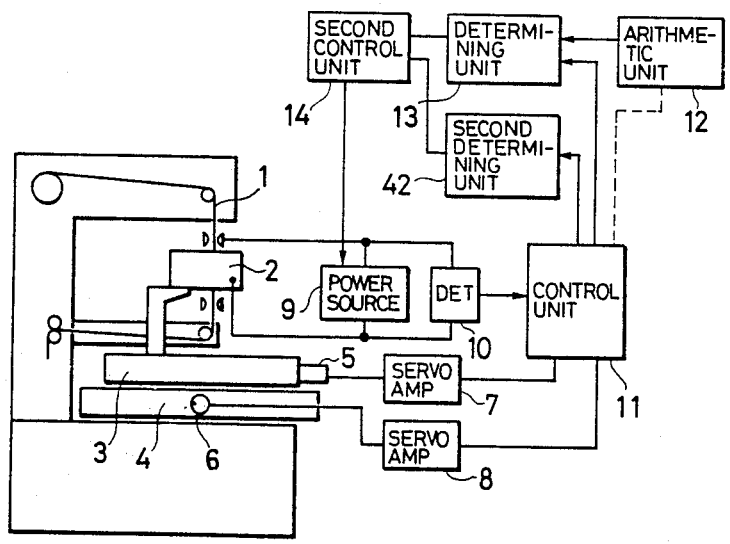

In FIG. 25 which shows the eighth embodiment of the present invention, a second determining unit 42 is provided to detect whether the present machining operation is a coarse machining operation or a finished machining operation. The determining unit 42 produces an output only when the finished machining operation is being carried out. In response to the outputs of the control unit 13 and the determining unit 42, the control unit 14 operates to select new machining electrical conditions and switches the output of the machining power source. After the corner machining operation, the new set conditions are restored to the previous ones. For instance, in the case of the inside corner machining operation, the control unit 14 switches the machining electrical conditions over to those for reducing the interelectrode gap so that overcutting due to the machining integration effect is eliminated.

Figure 26:
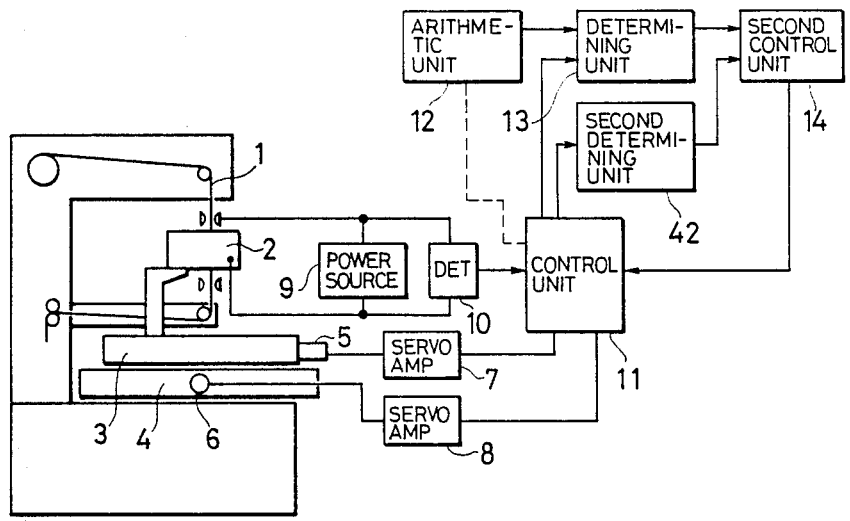
Figure 27:
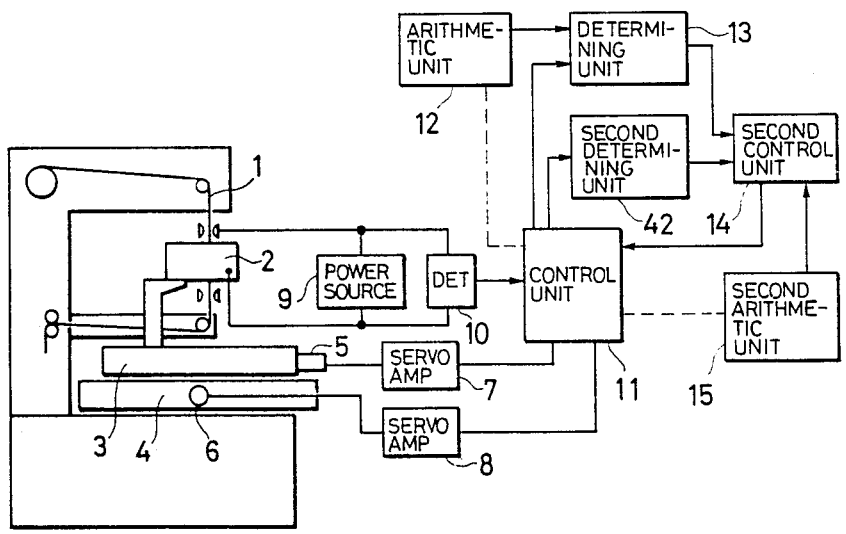

In FIGS. 26 and 27 which show the ninth and tenth embodiments of the present invention, the same type of determining unit 42 as that in FIG. 25 is provided to determine whether the present machining operation is the coarse machining operation or the finished machining operation. The other components shown in FIGS. 26 and 27 are the same as those in FIG. 23 and 24, respectively. In those embodiments, the control operation of the control unit 14 as described above is carried out only during the finished machining operation.

As was described above, the control means is provided to predict a change in the amount of removal at a corner thereby to correct the change of the interelectrode gap which attributes to the change in the amount of removal, according to the invention. Therefore, the invention can eliminate the difficulty that, for instance at a corner, the interelectrode gap changes with the amount of removal, as a result of which the machining accuracy is lowered. Thus, the invention can greatly improve the machining accuracy at corners.

What is claimed is:

1. A wire electrode type electric discharge machining apparatus in which a wire electrode and a workpiece to be machined are moved relative to each other with an interelectrode gap and a voltage is applied to said interelectrode gap between said wire electrode and workpiece to machine said workpiece into a desired configuration, comprising;

a first arithmetic means for calculating a first distance between a start point of a curved portion of said workpiece and a position before the start point where the amount of machining removal starts changing;

a first determining means for determining whether or not a second distance between a present machining position and the start point coincides with the first distance; and a control means for controlling the interelectrode gap to correct for the change thereof which is caused by a change in the amount of machining, in response to an output signal of said first determining means.

2. The apparatus as defined in claim 1 wherein said control means varies a reference voltage for an interelectrode servo to change the interelectrode gap in response to the output signal of said first determining means.

3. The apparatus as defined in claim 1 further comprising a second determining means for determining whether a curved portion is an inside corner or an outside corner, said control means varying a reference voltage for an interelectrode servo to change the interelectrode gap in response to the output signals of said first and second determining means.

4. The apparatus as defined in claim 1 further comprising a second arithmetic means for calculating a machining speed corrected according to the change in the amount of machining removal, said control means varying the machining speed in response to the outputs of said first determining means and said second arithmetic means.

5. The apparatus as defined in claim 4 further comprising a second determining means for determining whether a curved portion is an inside corner or an outside corner, said control means varying the machining speed in response to the outputs of said first and second determining means and said second arithmetic means.

6. The apparatus as defined in claim 1 wherein said control means varies machining electrical conditions to change the interelectrode gap in response to the output signal of said first determining means.

7. The apparatus as defined in claim 6 further comprising a second determining means for determining whether a curved portion is an inside corner or an outside corner, said control means varying machining electrical conditions to change the interelectrode gap in response to the outputs of said first and second determining means.

8. The apparatus as defined in claim 1 wherein said control means varies a gain of an interelectrode servo to change the interelectrode gap in response to the output of said first determining means.

9. The apparatus as defined in claim 1 further comprising a second determining means for determining whether a curved portion is an inside corner or an outside corner, said control means varying a gain for an interelectrode servo to change the interelectrode gap in response to the output signals of said first and second determining means.

10. The apparatus as defined in claim 1 further comprising a second arithmetic means for calculating a correction amount for a program locus at the curved portion with respect to the change in the amount of machining removal, said control means moving the program locus in response to the outputs of said first determining means an said second arithmetic means.

11. The apparatus as defined in claim 10 further comprising a second determining means for determining whether the curved portion is an inside corner or an outside corner, said control means moving the program locus in response to the outputs of said first and second determining means and said second arithmetic means.

12. The apparatus as defined in claim 1 further comprising a memory means for storing a predetermined amount of removal for a straight machining operation and a second arithmetic means for calculating an amount of removal for the curved portion according to the content of said memory means, said control means varying a reference voltage for an interelectrode servo to change the interelectrode gap in response to the outputs of said second arithmetic means and said first determining means.

13. The apparatus as defined in claim 1 further comprising a second determining means for determining whether the curved portion is an inside corner or an outside corner, said control means varying the reference voltage for an interelectrode servo to change the interelectrode gap in response to the outputs of said second arithmetic means and said first and second determining means.

14. The apparatus as defined in claim 1 further comprising a memory means for storing a predetermined amount of removal for a straight machining operation, a second arithmetic means for calculating an amount of removal for the curved portion according to the content of said memory means and a third arithmetic means for calculating a machining speed corrected according to the change in the amount of machining removal, said control means varying the machining speed in response to the outputs of said first determining means and said third arithmetic means.

15. The apparatus as defined in claim 14 further comprising a second determining means for determining whether the curved portion is an inside corner or an outside corner, said control means varying the machining speed in response to the outputs of said first and second determining means and said third arithmetic means.

16. The apparatus as defined in claim 1 further comprising a memory means for storing a predetermined amount of removal for a straight machining operation and a second arithmetic means for calculating an amount of removal for the curved portion according to the content of said memory means, said control means varying machining electrical conditions in response to the outputs of said second arithmetic means and said first determining means.

17. The apparatus as defined in claim 16 further comprising a second determining means for determining whether the curved portion is an inside corner or an outside corner, said control means varying the machining electrical conditions in response to the outputs of said second arithmetic means and said first and second determining means.

18. The apparatus as defined in claim 1 further comprising a memory means for storing a predetermined amount of removal for a straight machining operation and a second arithmetic means for calculating an amount of removal for the curved portion according to the content of said memory means, said control means varying a gain of an interelectrode servo to change the interelectrode gap in response to the outputs of said second arithmetic means and said first determining means.

19. The apparatus as defined in claim 1 further comprising a second determining means for determining whether the curved portion is an inside corner or an outside corner, said control means varying a gain of an interelectrode servo to change the interelectrode gap in response to the outputs of said second arithmetic means and said first and second determining means.

20. The apparatus as defined in claim 1 further comprising a memory means for storing a predetermined amount of removal for a straight machining operation, a second arithmetic means for calculating an amount of removal for the curved portion according to the content of said memory means and a third arithmetic means for calculating a correction amount for a program locus at the curved portion with respect to the change in the amount of machining removal, said control means moving the program locus in response to the outputs of said third arithmetic means and said first determining means.

21. The apparatus as defined in claim 20 further comprising a second determining means for determining whether the curved portion is an inside corner or an outside corner, said control means moving the program locus in response to the outputs of said third arithmetic means and said first and second determining means.

22. The apparatus as defined in claim 1 further comprising a first means for determining whether the present machining operation is a coarse machining operation or a finished machining operation, said control means varying a reference voltage for an interelectrode servo to change the interelectrode gap in response to the output signals of said first determining means and said first means.

23. The apparatus as defined in claim 22 further comprising a second determining means for determining whether the curved portion is an inside corner of an outside corner, said control means varying a reference voltage for an interelectrode servo to change the interelectrode gap in response to the outputs of said first and second determining means and said first means.

24. The apparatus as defined in claim 1 further comprising first means for determining whether the present machining operation is a coarse machining operation or a finished machining operation and a second arithmetic means for calculating a machining speed corrected according to the change in the amount of machining removal, said control means varying a machining speed in response to the outputs of said first determining means, said first means and said second arithmetic means.

25. The apparatus as defined in claim 24 further comprising a second determining means for determining whether the curved portion is an inside corner or an outside corner, said control means varying a machining speed in response to the outputs of said first and second determining means, said first means and said second arithmetic means.

26. The apparatus as defined in claim 1 further comprising first means for determining whether the present machining operation is a coarse machining operation or a finished machining operation, said control means varying machining electrical conditions in response to the outputs of said first determining means and said first means.

27. The apparatus as defined in claim 26 further comprising a second determining means for determining whether the curved portion is an inside corner or an outside corner, said control means varying machining electrical conditions in response to the outputs of said first and second determining means and said first means.

28. The apparatus as defined in claim 1 further comprising first means for determining whether the present machining operation is a coarse machining operation or a finished machining operation, said control means carrying a gain for an interelectrode servo to change the interelectrode gap in response to the outputs of said first determining means and said first means.

29. The apparatus as defined in claim 28 further comprising second determining means for determining whether the curved portion is an inside corner or an outside corner, said control means varying the gain for an interelectrode servo to change the interelectrode gap in response to the outputs of said first and second determining means and said first means.

30. The apparatus as defined in claim 1 further comprising first means for determining whether the present machining operation is a coarse machining operation or a finished machining operation and a second arithmetic means for calculating a correction amount for a program locus at the curved portion with respect to the change in the amount of machining removal, said control means moving the program locus in response to the outputs of said first determining means, said first means and said second arithmetic means.

31. The apparatus as defined in claim 30 further comprising a second determining means for determining whether the curved portion is an inside corner or an outside corner, said control means moving the program locus in response to the outputs f said first and second determining means, said first means and said second arithmetic means.

* * * * *